Oct. 30, 1934.  G. W. SHRIKE ET AL  1,978,694
FOLDING AUTOMOBILE TOP
Filed Dec. 26, 1931

INVENTORS
G. W. SHRIKE
W. C. BERRY
BY
ATTORNEY

Patented Oct. 30, 1934

1,978,694

UNITED STATES PATENT OFFICE 1,978,694

FOLDING AUTOMOBILE TOP

Garnett W. Shrike and William C. Berry,
St. Louis, Mo.

Application December 26, 1931, Serial No. 583,312

2 Claims. (Cl. 296—99)

This invention relates generally to automobile tops, and more specifically to a folding top for rumble seats of motor vehicles, the predominant object of the invention being to provide an improved foldable enclosure adapted for association with the portion of a motor vehicle known as the rumble seat, said foldable enclosure being movable to its effective upright position or foldable to a collapsed position within the body of the motor vehicle when not in use. The improved structure when in its effective upright position serves to protect the occupants of the rumble seat with which it is associated from the elements, and when folded within the body of the motor vehicle in its ineffective position does not interfere in any way with the normal use of the rumble seat. Also, the improved structure is simple in construction and operation, and when in use does not detract from the appearance of the motor vehicle but rather improves such appearance.

Figure 1:
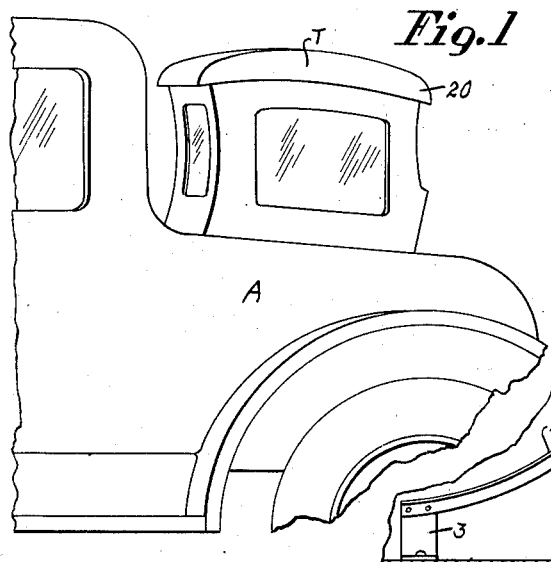
Fig. 1 is a fragmentary perspective of a motor vehicle provided with the improved foldable top.

In the drawing, wherein is shown for the purpose of illustration, merely, one embodiment of the invention, A designates the body of a motor vehicle of the coupé type, said motor vehicle body being provided with a compartment B in the rear portion thereof wherein a seat C is arranged to provide what is popularly known as a "rumble seat". The seat C is provided with a suitable back D, the particular seat-back illustrated in the drawing being hinged at E to permit the same to be moved to a position where the cushion of the seat back is located within the compartment B at the top thereof and where the plate F with which said seat-back is associated serves as a closure for the opening B' leading to the compartment B.

Figure 4:
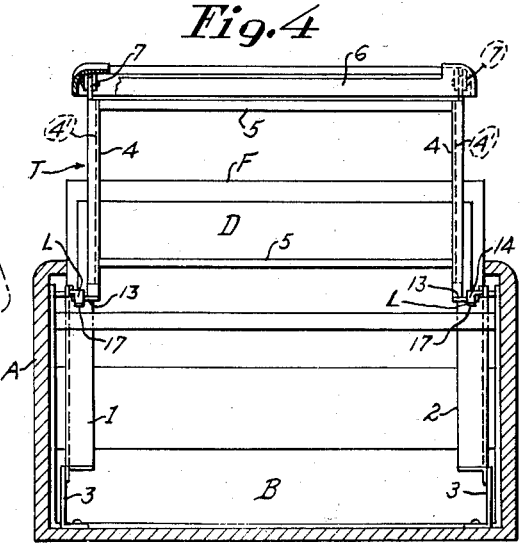
Fig. 4 is a cross-sectional view through the rumble seat compartment of a motor vehicle body and showing the improved folding top in its effective position.

Arranged within the compartment B at opposite sides thereof are curved guiding members 1 and 2 which are secured to the bottom of the compartment B, said guiding members being attached to the bottom of the compartment through the instrumentality of suitable U-shaped brackets 3 (Fig. 4). The upper ends of the guiding members 1 are located adjacent to the forward end of the opening B' leading to the compartment B, and said guiding members are curved downwardly and forwardly within the body of the motor vehicle.

The improved folding top, which is designated generally by the reference character T includes a front frame member which comprises a pair of oppositely disposed side members 4 between which cross members 5 extend, said side members and cross members preferably being integrally connected so as to produce a unitary frame member. The side members 4 follow a curvature which corresponds to the curvature of the guiding members 1, as shown clearly in Figs. 2 and 3, and said side members are of such cross-sectional shape that channelways 4' are provided into which the guiding members 1 and 2 extend.

Figure 2:
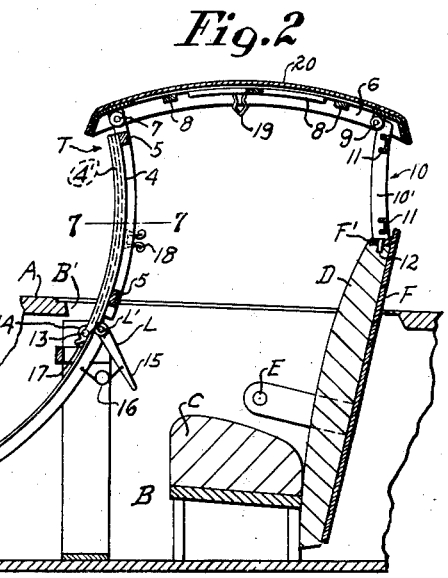
Fig. 2 is a fragmentary sectional view showing the invention in association with a motor vehicle in its effective upright position.
Figure 5:
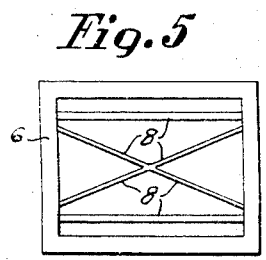
Fig. 5 is a plan view on a reduced scale of the upper member of the frame of the improved structure.
Figure 6:
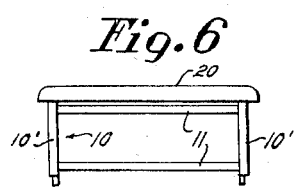
Fig. 6 is a rear elevation on a reduced scale of the rear member of the frame of the structure.
Figure 7:
Fig. 7 is an enlarged cross-section on line 7—7 of Fig. 2.

The upper member 6 of the frame of the improved folding top is also of a slightly curved shape, as shown in Fig. 2, and is hingedly attached at the points designated by the reference character 7 to the upper ends of the side members 4 of the front frame member. The upper frame member, as is clearly shown in Fig. 5, comprises a rectangular marginal element to which the required rigidity is imparted by suitable braces 8, the marginal element and the braces providing a unitary member which preferably is of integral construction.

Hingedly attached to the upper frame member 6 adjacent to the rear thereof and at the points designated by the reference characters 9 is the rear frame member 10 of the improved folding top. The rear frame member comprises a pair of oppositely disposed side members 10' between which cross bracing elements 11 are extended, the side members and the cross bracing elements of the rear frame member providing a unitary frame member which preferably is of integral construction. At the lower ends of the side members of the rear frame member dowel pins 12 are arranged which, when the folding top is in its upright, effective position, are introduced into apertures formed through a flange F' formed on the plate F and located at the top of the seat-back D.

Secured to the opposite side members 4 of the front frame of the folding top are brackets which include pins 13 that extend horizontally at points just above the respective curved guiding members 1 and 2. The pins 13 are adapted to be engaged by locking devices L which serve to lock the folding top in its upright effective position, there being one of said locking devices at each side of the compartment B. The locking devices are pivotally attached at L' to the upper end portions of the curved guiding members 1 and 2 and comprise each a curved portion 14, which is adapted to engage one of the pins 13, and an operating portion 15 which serves to facilitate movement of the locking device about its pivot. The locking devices each include a torsional spring 16 which acts to force the curved portion thereof against the associated guiding member, and also the curved portion 14 of each locking device is provided with an inclined portion 17 with which the associated pin 13 may contact when the folding housing is being raised to its elevated position, so as to trip said locking device and cause the curved portion 14 thereof to engage said associated pin.

Figure 3:
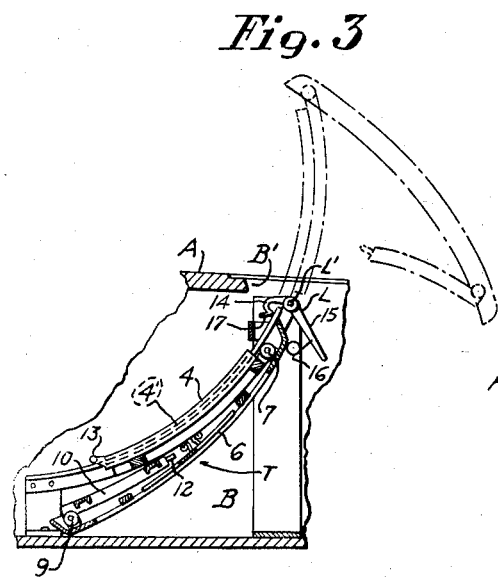
Fig. 3 is a fragmentary sectional view showing the folding top in a collapsed position within the body of a motor vehicle and illustrating by means of dotted lines the manner of folding the top preparatory to moving same to its position within the body of the motor vehicle.

The side elements of the front frame member of the folding top and the upper member of said folding top are provided with interengaging elements 18 and 19, respectively, which serve to connect said upper member to the front member when the top is folded, as shown in Fig. 3. The elements 18 associated with the front frame members comprise yieldable gripping devices into which the elements 19 associated with the upper member are moved when the upper member is moved to a collapsed position adjacent to the front member, and said elements 18 are so shaped that they frictionally grip the elements 19 so as to retain the upper frame member in the position adjacent to the front member to which it has been moved.

The upper member 6 of the folding top is provided with a top covering 20 which is secured in place in any suitable manner. Also, the folding top is provided with flexible front, side, and rear walls of canvas or other suitable material which are secured to the frame members of the folding top in any suitable manner, as, for instance, by means of fastening devices of the glove fastener type. The flexible walls of the folding top are shown in Fig. 1, but are eliminated in the other views for the sake of simplicity of illustration, and said walls preferably are provided with openings closed by flexible transparent material.

When the improved folding top is not in use it is arranged in a collapsed condition within the body of the motor vehicle, as shown in Fig. 3, and when so positioned the rumble seat of the motor vehicle may be used without interference from the collapsed top, as said collapsed top is so located that it does not deprive the occupants of the rumble seat of the required leg room. When it is desired to elevate the top to its effective position, the entire collapsed top is drawn upwardly through the opening B', the side members 4 of the front frame member of said top sliding along the guiding members 1 and 2 which extend into the channelways of said side members 4. When the collapsed top has been raised sufficiently the pins 13 will contact with the inclined portions 17 of the locking devices L, whereby said locking devices will be tripped and the pins will move into and be embraced by the curved portions 14 of said locking devices. In this manner the front frame member will be firmly held by the locking devices L in its elevated position. The upper member 6 will then be moved about its pivots 7 to a substantially horizontal position, and the rear member 8 will be moved to a substantially vertical position, and the dowel pins 12 thereof will be introduced into the apertures formed in the flange F' of the plate F associated with the seat-back of the rumble seat. The flexible front, side, and rear walls of the folding top are then applied to the frame members of the folding top to provide an enclosure for the occupants of the rumble seat.

To fold and store the folding top within the body of the motor vehicle the flexible front, side, and rear walls are detached and the rear frame member 10 is folded against the upper frame member 6, as shown by dotted lines in Fig. 3. The upper frame member 6 with the rear frame member folded thereagainst is then moved to a position adjacent to the front frame member, the interengaging gripping elements 18 and 19 cooperating with each other to retain the frame members 6 and 10 in the position adjacent to the front frame member to which they have been moved. The handle portions 15 of the locking devices L are then depressed against the force of the springs 16, thereby raising the curved portions 14 of said locking devices and releasing the pins 13. This will permit the entire collapsed top to move downwardly and forwardly into the body of the motor vehicle along the guiding members 1 and 2, where it remains until it is desired to again use same.

The covering of the upper frame member 6 may be permanently fixed thereto, or, if preferred, said covering may be arranged so that it may be removed when desired, as when the folding top is being folded and stored away within the body of the motor vehicle.

We claim:

1. In combination with a motor vehicle body having a rumble seat, a folding top for said rumble seat, said folding top comprising a plurality of frame members including a front frame member hingedly attached together and foldable to a collapsed position, and guiding means comprising forwardly and downwardly curved guiding members for guiding said folding top in a collapsed condition to a position within the body of the motor vehicle, said front frame member being curved in conformity to the curvature of said guiding members and being slidable longitudinally along said guiding members when the folding top is moved to elevated and lowered positions.

2. In combination with a motor vehicle body having a rumble seat, a folding top for said rumble seat, said folding top comprising a front frame member, an upper frame member hingedly attached to said front frame member, and a rear frame member hingedly attached to said upper frame member, guiding means for guiding said folding top in a collapsed condition to a position within the body of the motor vehicle, said guiding means comprising forwardly and downwardly curved guiding members and said front frame member being correspondingly curved and being provided with channelways into which said guiding members extend, locking means for securing said front frame member in its elevated position, and means associated with said rear frame member adapted to engage a portion of the vehicle for maintaining said rear frame member and said upper frame member in their elevated positions.

GARNETT W. SHRIKE.
WILLIAM C. BERRY.